United States Patent [19]
Williamson

[11] Patent Number: 5,357,815
[45] Date of Patent: Oct. 25, 1994

[54] MAGNETICALLY DRIVEN GAUGE WITH VOLTAGE DIVIDER

[75] Inventor: Cecil M. Williamson, Carrollton, Tex.

[73] Assignee: Rochester Gauges, Inc., Dallas, Tex.

[21] Appl. No.: 174,718

[22] Filed: Dec. 29, 1993

Related U.S. Application Data

[63] Continuation of Ser. No. 16,520, Feb. 10, 1993, abandoned.

[51] Int. Cl.$^5$ .................... G01F 23/36; G01F 23/38
[52] U.S. Cl. .................... 73/866.3; 73/308; 73/313; 73/DIG 5; 338/33
[58] Field of Search ............. 73/305, 308, 313, 314, 73/317, 866.3, DIG. 5; 338/12, 33

[56] References Cited

U.S. PATENT DOCUMENTS

| | | |
|---|---|---|
| 1,304,022 | 5/1919 | Cole . |
| 2,615,085 | 10/1952 | Smulski ................ 73/313 |
| 2,992,560 | 7/1961 | Morgan et al. ......... 73/317 |
| 3,688,795 | 9/1972 | Taylor ................ 137/558 |
| 3,709,038 | 1/1973 | Werner ................ 73/313 |
| 3,739,641 | 6/1973 | Taylor et al. ......... 73/313 |
| 4,688,587 | 8/1987 | Bourgeon .............. 137/2 |
| 4,779,461 | 10/1988 | Gilman et al. ......... 75/865.3 |
| 4,911,011 | 3/1990 | Fekete et al. ......... 73/313 |
| 5,182,545 | 1/1993 | Goekler et al. ........ 340/620 |

FOREIGN PATENT DOCUMENTS 5486720  5/1982  Japan .................... 73/305

*Primary Examiner*—Hezron E. Williams
*Assistant Examiner*—Daniel S. Larkin
*Attorney, Agent, or Firm*—Richards, Medlock & Andrews

[57] ABSTRACT

A gauge assembly (10) utilizing a voltage divider circuit to provide reliable and accurate measurement of a fluid level within a tank (16) or other environment. A pointer assembly (52) pivots about an axis (42) in response to a moving float to indicate the fluid level. A plurality of contact arms (114, 116, 118) extending from a contact plate (58) on the pointer assembly (52) resiliently engage a point (120) along a resistive element (88). The first end of the resistive element is connected to a voltage regulator (100) which is connected to a first contact (94). The second end of the resistive element forms a second contact (96). The point (120) of contact between the contact arms and resistive element is connected to an amplifier (102) which is connected to a third contact (95) forming a low impedance voltage divider circuit.

8 Claims, 2 Drawing Sheets

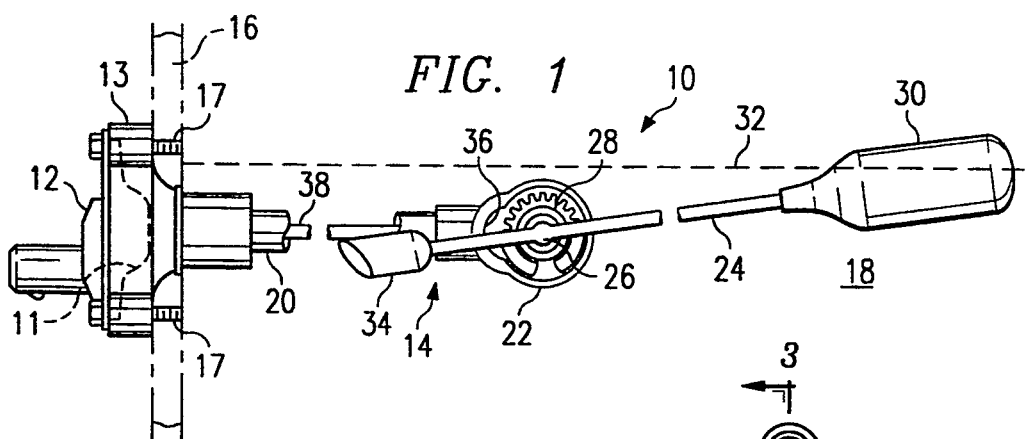
FIG. 1
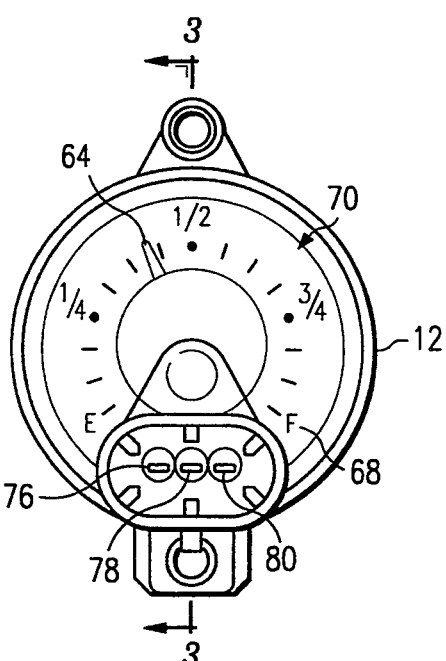
FIG. 2
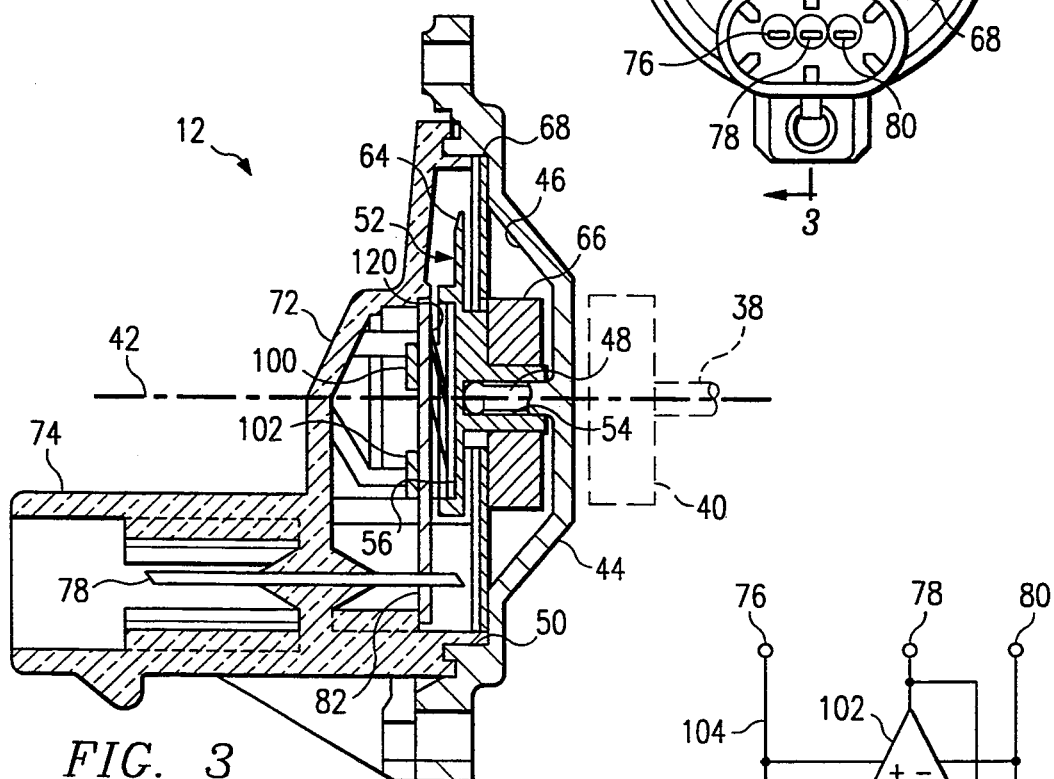
FIG. 3
FIG. 4

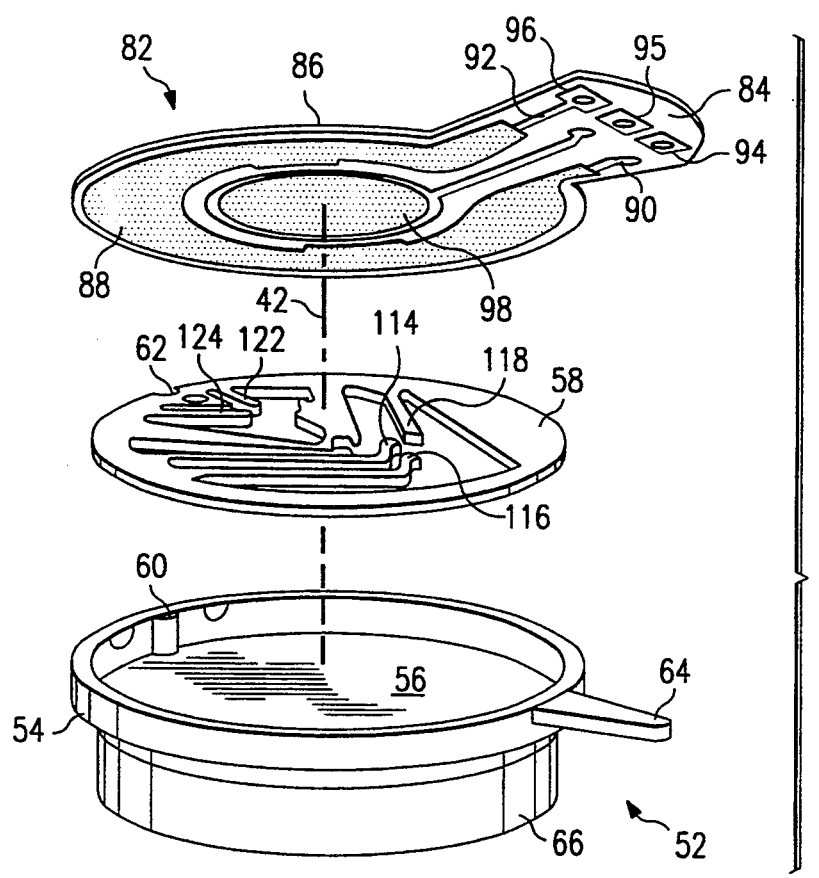
FIG. 5
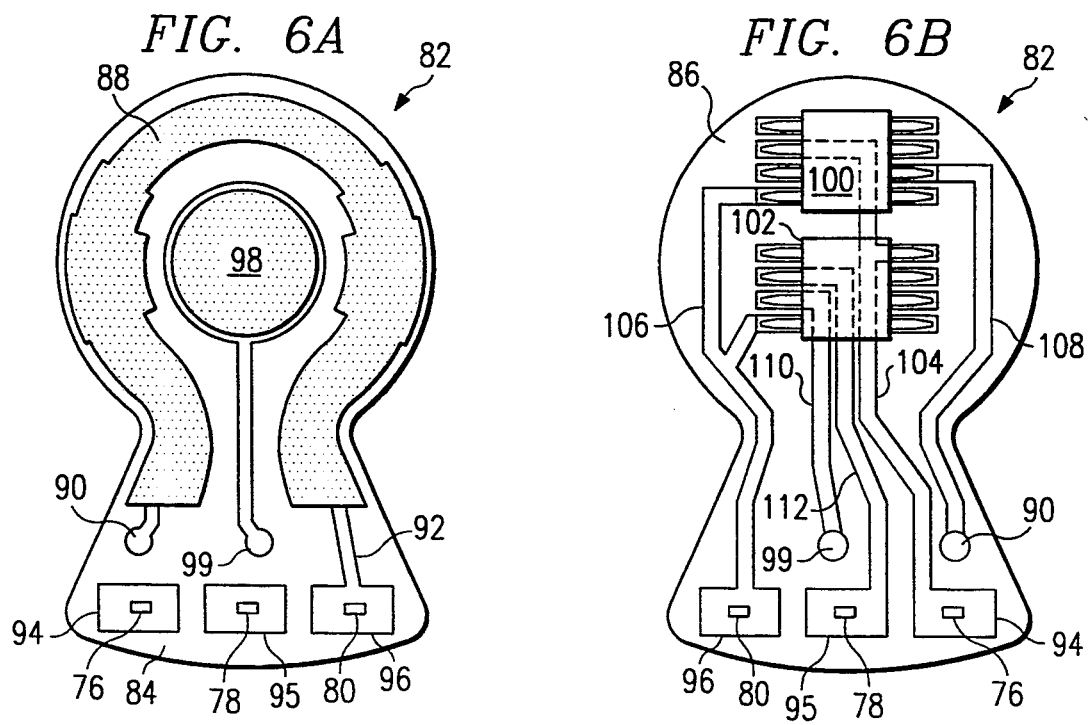

MAGNETICALLY DRIVEN GAUGE WITH VOLTAGE DIVIDER

CROSS REFERENCE TO RELATED APPLICATIONS

This is a continuation of U.S. patent application Ser. No. 08/016,520 now abandoned filed Feb. 10, 1993.

TECHNICAL FIELD OF THE INVENTION

This invention relates to a gauge for measuring a fluid level, and in particular to a gauge incorporating a voltage divider circuit which provides a conditioned output signal.

BACKGROUND OF THE INVENTION

The invention relates to fluid sensing gauges. A common type of gauge is the float gauge, which has a float that floats on the surface of the fluid being measured. The float usually is connected with other members which move with the float as the fluid level changes. Movement of the float and attached members is sensed by a gauge, typically through a magnetic coupling, to provide an indication, either visual or otherwise, of the fluid level.

A common float gauge used for many years incorporates a variable resistor in the gauge to vary a resistance with a change in the fluid level. In such a gauge, a wiper arm is moved along a resistance element as the float changes level. The resistance is measured between one end of the resistance element and the wiper arm, which corresponds to the float position. While such a circuit is effective, it does suffer certain disadvantages. These disadvantages include the requirement for adjusting the resistance output to correspond to the float position. Further, changes in such variables as contact resistance, hook-up wire length, temperature, and voltage applied across the resistance can actually vary the response of the gauge, leading to an inability to reproduce results and maintain gauge accuracy.

Some of the disadvantages of the variable resistor gauge were addressed in U.S. Pat. No. 4,911,011, which disclosed a gauge with a magnetically driven voltage divider. However, gauges with the voltage divider disclosed in that patent provide a high impedance output signal which is a percentage of the input voltage. Thus, the gauge has the disadvantage of having limited applications unless the user provides additional components to employ the electrical output signal of the gauge.

Thus, there has been a need for a gauge which is more universally acceptable and readily received by standard equipment, such as refrigeration units and tow motors manufactured by a number of different manufacturers. The gauge of the present invention has a compact design, provides an output which is more immune to noise and has circuitry which is less vulnerable to environmental hazards. The present invention also has the advantage of being useful with different power systems, such as 12 volt DC or 24 volt DC systems found on many industrial vehicles and apparatus. The present gauge accepts power from any such system and provides an industry standard output signal which will interface directly with industrial control devices and meters.

SUMMARY OF THE INVENTION

In accordance with one aspect of the present invention, a gauge assembly is provided for measuring a fluid level. The gauge assembly includes a gauge having a resistive element with first and second ends with a voltage regulator attached to the first end of the resistive element to supply a constant voltage to the resistive element. A first contact is provided for power input to the voltage regulator and to a current amplifier. A second contact is provided at the second end of the resistive element for ground. A movable element is provided which has a conductive arm in electrical contact with the resistive element at a point along the resistive element. The conductive arm is electrically connected to a current amplifier. The current amplifier output is connected to a third contact. The gauge includes a coupler which is attached to the movable element and couples with a cooperating coupler on the fluid sensor. The fluid level sensor has a structure provided for sensing the level of the fluid and a cooperating coupler which engages the gauge coupler. As a result, changes in fluid level cause the movement of the movable element and conductive arm to a position along the resistive element corresponding to the level sensed. The gauge assembly thereby forms a voltage divider circuit with a regulated voltage input and amplified output indicating the fluid level.

In accordance with another aspect of the present invention, the movable element is mounted within the gauge for rotation about an axis. The resistive element, voltage regulator, amplifier and contacts are formed or mounted on a plate of non-conductive material lying generally perpendicular to the axis and proximate the movable element. The resistive element is formed in a semi-circular arc on the plate at a predetermined radius from the axis. In the preferred embodiment, both couplers are magnets.

BRIEF DESCRIPTION OF THE DRAWINGS

Further objects and advantages of the invention will become more apparent from the following description and claims, and from the accompanying drawings, wherein:

FIG. 1 is a view of a gauge assembly representing an embodiment of the present invention which includes a gauge and a fluid sensing structure;

FIG. 2 is a front view of a gauge alone representing a further embodiment of the present invention;

FIG. 3 is a vertical cross sectional view of the gauge 12 shown in FIG. 1;

FIG. 4 is an electrical schematic diagram of a voltage divider circuit used in conjunction with the present invention;

FIG. 5 is an exploded perspective view of the components of the gauge shown in FIG. 2;

FIG. 6A is one side of the printed circuit board shown in FIG. 5; and

FIG. 6B is the other side of the printed circuit board of FIG. 5.

DETAILED DESCRIPTION

With reference now to the drawings, and particularly to FIGS. 1 and 3, a gauge assembly 10 is shown which represents a first embodiment of the present invention. Like numbers in each figure refer to the same item. The gauge assembly 10 includes a gauge 12 resting in a recess 11 of mounting bracket 13 of a fluid level sensing structure 14. The gauge 12 and fluid sensing level structure 14 can be mounted to tank 16 by bolts 17 at a convenient position on the wall of tank 16 containing a fluid 18. The mounting bracket may also be separately bolted to the tank and the gauge attached to the mounting bracket by a separate set of screws. Alternatively, the portion of the mounting bracket extending through the tank can be supplied with screw threads to mate with a threaded opening in the tank. In this embodiment, the gauge can then be screwed onto the face of the mounting bracket. The tank 16 can contain a fluid such as fuel or liquefied refrigerant, such as freon.

The fluid level sensing structure 14 includes an arm 20 that extends from the gauge 12 and into the tank 16 to a fitting 22. An arm 24 is mounted at a point along its length to fitting 22 for pivotal motion about an axis 26. A gear 28 is mounted on arm 24 for movement with the arm. A first end of the arm 24 mounts a float 30 which is so configured as to float at surface 32 of the fluid 18. A counterweight 34 is mounted at the opposite end of the arm 24. The gear 28 meshes with a gear 36 (not shown) on a shaft 38 extending within the arm 20 to near gauge 12. The end of the shaft 38 proximate the gauge 12 has a magnet 40 mounted thereto.

The pivot arm 24 pivots about axis 26 as the float 30 follows the level of the fluid. The pivotal motion of the arm 24 causes gear 28 to rotate gear 36 and shaft 38 to rotate the magnet 40 about an axis 42.

FIG. 1 illustrates one possible embodiment of a fluid level sensing structure 14 which imparts movement to magnet 40. Magnet 40 serves as a coupler to transmit movement of the float 30 to the gauge 12. Other fluid sensing structures can be used.

With reference to FIGS. 2-6, the effect of the movement of magnet 40 about axis 42 affects the gauge 12 as described hereinafter. Gauge 12 has a base 44, including a recess 46 and a pivot pin 48 extending within the recess and along the axis 42. An annular surface 50 forms a perimeter about the recess 46.

A pointer assembly 52 is provided with a recess 54 to fit over the pivot pin 48 on base 44. The pointer assembly 52 thus pivots or rotates about axis 42 with relatively little friction. On the side of pointer assembly 52 opposite recess 54, there is formed a disc-shaped recess 56 which receives a contact plate 58. An alignment protrusion 60 on pointer assembly 52, and mating alignment groove 62 on the contact plate 58, orient the plate 58 relative to assembly 52 about axis 42. A pointer 64 extends outwardly from one side of the assembly 52 generally along a radius extending from the axis 42. A magnet 66 is secured to pointer assembly 52 and serves as a coupler by interacting with the magnet 40 so that the position of the pointer assembly 52 about axis 42 correlates directly with the position of the float 30, and thus the surface level of fluid 18.

An annular face plate 68 (see FIGS. 2 and 3) rests on the surface 50 and includes visible indicia 70 to correlate the position of the pointer 64 with the fluid level in the tank 16.

Referring to FIG. 3, a cover 72, preferably formed of a clear plastic, mates with the base 44. An electrical connector 74 which is integral with cover 72 has three prong contacts 76, 78 and 80. Mounted within the cover 72 is a printed circuit bard 82, which is made of nonconductive material, has a first side 84 and a second side 86.

Referring to FIGS. 5 and 6a, a resistive element 88 is deposited on the first side 84 of board 82 in a generally semi-circular arc. The deposited resistive element 88 has a first end 90 formed by a printed circuit lead to the resistive element. The second end 92 is a printed circuit lead which is connected to a second contact 96. A conductive surface 98, having end 99 formed by a printed circuit lead connected to the conductive surface, is formed on the side 84 of the board 82 and is electrically isolated from the resistive element 88. First, second and third contacts 94, 96, and 95 are provided for soldering prong contacts 76, 78 and 80 to the board 82. The first and third contacts 94 and 95 are formed on the first side of the board 82 and are electrically isolated from the resistive element 88. This configuration is preferred because contacts 76, 78 and 80 (not illustrated in FIG. 5) are allowed to protrude through board 82 for more secure soldering.

Referring to FIG. 6b, on the second side 86, first contact 94 is connected to a voltage regulator 100 and a current amplifier 102 by printed circuit lead 104 to provide power to both units. Second contact 96 is connected to the voltage regulator 100 and amplifier 102 via lead 106 to provide a ground. The first end 90 of the resistive element 88 passes through the board 82 to connect the first end 90 with the voltage regulator 100 via lead 108. End 99 of conductive surface 98 passes through the board 82 and provides an input signal to amplifier 102 via printed circuit lead 110. The output signal of current amplifier 102 is transmitted through lead 112 to third contact 95, which is connected to third prong 78. The first prong contact 76 is soldered to the first contact 94. The second prong contact 80 is soldered to the second contact 96.

A selected embodiment of the voltage regulator 100 is a model REF 02 made by Analog Devices. A selected embodiment of the amplifier 102 is a model LM358 made by National Semiconductor.

When the cover 73 is assembled on base 44, as seen best in FIG. 3, the conductive surface 98 extends over axis 42. Similarly, the semi-circular arc of the resistive element 88 defines a semi-circular arc about the axis 42 at a predetermined radius from the axis 42.

With reference to FIG. 5, the contact plate 58 includes resilient contact arms 114, 116 and 118 which resiliently engage the resistive element 88 at a point 120 on the resistive element determined by the position of the float 30. The plate 58 also has resilient center contact arms 122 and 124 which are resiliently engaged against the conductive surface 98 of the board 82 to provide a direct electrical connection between the conductive surface 98 and the point 120 of contact between arms 114, 116 and 118 and the resistive element 88.

Numerous advantages are provided by the gauge assembly 10 incorporating the circuit of the present invention as compared with prior designs. The circuit of the present invention allows a precision voltage to be applied to the resistive element, and the current amplifier provides a precision voltage output. This permits the gauge to be directly interfaced with programmable logic controllers, analog meters and computers used with conventional industrial equipment and vehicles. One advantage is that the gauge may be used with different power supplies and yet provide a uniform output. Further, the present design eliminates the need for external components. The low impedance signal generated by the unit is suitable for driving analog meters. The cover 72 and base 44 can be sealed together to form a completely waterproof connection.

FIG. 4 illustrates a schematic electrical circuit used in conjunction with the gauge assembly 10. This circuit defines a voltage divider which can be connected to an external programmable logic device or analog meter through the connector 74 to provide an accurate representation of the position of point 120, and therefore directly indicate the fluid level in the tank 16.

The resistive element 88 is preferably a thick film element, which is more durable than a wire wound element.

In one gauge assembly constructed in accordance with the teachings of the present invention, the resistive element 88 is formed of a conductive polymer with a substrate of glass epoxy. The contact plate, and resilient arms, are formed of nickel silver while the magnets are alnico. The base 44 and cover 72 are both made of LEXAN while the pointer 64 is made of acetal. The nominal total resistance of the element 88 between the first and second contacts is 15 Kohms +/−30% with the linearity within 3%. The gauge assembly 10 in the preferred embodiment is designed for a power rating of ½ watt with input voltage to the voltage regulator 100 in the range from 7-28 volts DC. The unit preferably has a response time of ½ second to a change in a fluid level. The output signal is 0-5 volts DC at contact 78.

As shown in FIG. 4, the circuit of the present invention contains a voltage regulator 100. Preferably, voltage regulator 100 accepts input voltages of between 7-28 volts DC and produces a constant output of 5 volts DC. In this way, the gauge assembly 10 accepts inputs from the two most common voltage systems in use. These systems produce 12 and 24 volts DC, respectively.

Voltage regulator 100 receives power via contact 76. Regulator 100 provides a constant voltage (5 volts DC) to the resistive element 88.

The conductive arm or arms 114, 116, 118 sweep along the resistive element 88 in response to changes to the level of fluid in the tank and sends a signal to amplifier 102. In a preferred embodiment, amplifier 102 has a gain of 1, thus producing a buffered signal ranging from 0-5 volts, corresponding to respective empty and full levels of fluid in the tank 16. The output signal from the amplifier 102 is conveyed via prong contact 78 for input to various kinds of programmable logic devices, which are commonly designed to receive signals up to 5 volts DC. Thus, the present invention has the advantage that the gauge assembly 10 is useful with a number of different power sources found on industrial equipment, i.e., 12 volt and 24 volt DC systems. No matter which power system is utilized, the gauge produces output of between 0-5 volts, thus making it more versatile for different applications. Further, in the preferred embodiment, the gauge components are mounted on the circuit board and the circuit board is sealed within the covering elements. Thus, the circuitry is protected against environmental elements. Further, the possibility of induced noise is greatly reduced by minimizing the length of the circuit conductance. Also, in the preferred embodiment, the resistive element is of 15,000 Ohms or greater, so that small changes in resistance will cause less effect than those of ordinary resistance senders utilizing a narrow range of resistance.

While one embodiment of the present invention has been illustrated in the accompanying drawings, and described in the foregoing Detailed Description, it will be understood that the invention is not limited to the embodiment disclosed, but is capable of numerous rearrangements, modifications and substitutions of parts and elements without departing from the scope and spirit of the invention.

I claim:
1. A gauge for measuring a fluid level, comprising:
   (a) a base having a recess and a pivot pin extending therefrom;
   (b) a pointer assembly mounted on the pivot pin for rotation about an axis, the pointer assembly including a contact plate thereon, said contact plate including at least one resilient conductive arm and at least one conductive element
   (c) a nonconductive board positioned proximate the pointer assembly, said nonconductive board including:
      (i) a voltage regulator electrically connected to a first contact and to a resistive element;
      (ii) a resistive element formed in a semi-circular arc at a predetermined radius about said axis having first and second ends and contacted by said conductive arm at a point along said resistive element determined by the angular position of the pointer assembly relative to said first axis, said first end connected to said voltage regulator, and said second end connected to a second contact;
      (iii) a conductive surface being formed on the board at said axis and contacted by said conductive element; and
      (iv) a current amplifier connected to said conductive surface having a third contact connected to the output of said amplifier;
   (d) a coupler attached to said pointer assembly for moving the pointer assembly about said axis.

2. The gauge of claim 1 wherein said conductive element comprises a resilient central conductive arm on the contact plate resiliently engaging said conductive surface.

3. The gauge of claim 1 further defining a cover, the board mounted in the cover, the cover secured to the base to form a fluid tight interior enclosing the pointer assembly, contact plate and board.

4. The gauge of claim 1 wherein the voltage regulator produces a constant voltage output.

5. The gauge of claim 1 wherein the said amplifier has a gain of 1.

6. The gauge of claim 5 wherein said voltage regulator produces a constant voltage output.

7. The gauge of claim 1 wherein said coupler is a magnet.

8. The gauge of claim 3 wherein said coupler is a magnet.

* * * * *